US006554206B2

(12) United States Patent  (10) Patent No.: US 6,554,206 B2
Watt  (45) Date of Patent: Apr. 29, 2003

(54) APPARATUS AND METHOD FOR APPLYING SPRAYED FLUID TO A MOVING WEB

(75) Inventor: Kenneth R. Watt, Huron, OH (US)

(73) Assignee: Watt Fluid Applications, LLC, Huron, OH (US)

(*) Notice: Subject to any disclaimer, the term of this patent is extended or adjusted under 35 U.S.C. 154(b) by 56 days.

(21) Appl. No.: 09/864,390

(22) Filed: May 25, 2001

(65) Prior Publication Data

US 2002/0084351 A1 Jul. 4, 2002

Related U.S. Application Data

(60) Provisional application No. 60/259,515, filed on Jan. 4, 2001.

(51) Int. Cl.[7] .............................. B05B 1/28; B05B 9/00; A62C 31/00; A62C 37/20
(52) U.S. Cl. ....................... 239/122; 239/124; 239/125; 239/436; 239/562
(58) Field of Search ................................. 239/122, 436, 239/443, 444, 451, 548, 551, 553.5, 554, 556, 562, 569, 124, 125, 127; 427/421, 475, 479, 480, 482; 118/302, 64, 326, 364, 308, 309; 156/279, 280

(56) References Cited

U.S. PATENT DOCUMENTS

| 4,339,296 A | * | 7/1982 | Gursky et al. ............... 156/345 |
| 4,389,279 A | * | 6/1983 | Weber et al. ................ 156/640 |
| 4,545,324 A | * | 10/1985 | Browning ..................... 118/634 |
| 6,374,901 B1 | * | 4/2002 | Frank et al. ................. 164/414 |

OTHER PUBLICATIONS

Love, III et al., Method and Apparatus for the Descaling of Metal, U.S. Patent Application Publication, Pub No. US2001/0047576 A1.*

* cited by examiner

Primary Examiner—Michael Mar
Assistant Examiner—Davis Hwu
(74) Attorney, Agent, or Firm—Miles & Stockbridge P.C.

(57) ABSTRACT

Apparatus and method for spray coating of a horizontally moving web uses a spray-down unit that sprays downwardly onto the web and a spray-up unit that sprays upwardly onto the web. Each unit has adjustable cut-offs that control the length of the spray pattern by intercepting end portions of the spray pattern. The cut-offs of each unit can be adjusted to block a spray emission opening so as to prevent the entrance of contaminants when the unit is not in operation. Fluid intercepted by the cut-offs is returned for re-use. Both units are supported on a frame, and the spray-down unit can be moved away from the spray-up unit.

35 Claims, 6 Drawing Sheets

APPARATUS AND METHOD FOR APPLYING SPRAYED FLUID TO A MOVING WEB

CROSS-REFERENCE TO CO-PENDING APPLICATION

This application is based upon Provisional Application No. 60/259,515 filed Jan. 4, 2001, incorporated herein by reference.

BACKGROUND OF THE INVENTION

This invention is concerned with the application of sprayed fluid to surfaces of an object such as a moving web, and is more particularly concerned with apparatus that includes a pair of vertically separated spray generating units for applying fluid to opposite surfaces of a web that moves horizontally between the units, and with the control of spray patterns.

Commonly owned U.S. Pat. No. 5,314,119 granted May 24, 1994 (incorporated herein by reference) discloses and claims apparatus for applying thin coatings of fluid droplets to an adjacent surface by the use of a pick-up roll rotating in a supply of fluid and a rotating brush roll. The two rolls counter-rotate with an interference between them, so that bristles of the brush roll are bent as their tips pick up droplets of fluid. After passing out of interference, the bristles snap away from the pick-up roll and project a spray of droplets against a surface of an object to be coated, e.g., a moving web. Coating uniformity is ensured by the use of elements such as a family of windage dams and seals, baffles, blades and mist eliminators, and by the use of a brush roll with a slight spiral. Two fixed shields, one at each end of the spray pattern, isolate the spray pattern from cross currents. The length of the spray pattern laterally of a moving web is controlled by the length of the brush roll and pick-up roll.

In a specific embodiment disclosed in the aforesaid patent, the spray is directed horizontally for application to one surface of a vertically moving web, but re-arrangement of the pick-up roll, the brush roll and accompanying parts would permit the spray to be directed to a non-vertically-moving web, such as a web that is moving horizontally. However, even with such re-arrangement the spray would still be applied to only one surface of the web, and the length of the spray pattern laterally of the web would still be determined by the length of the pick-up and brush rolls.

BRIEF DESCRIPTION OF THE INVENTION

There is a need for applying sprayed fluid simultaneously to opposite surfaces of a moving web, especially a web moving horizontally, and for applying sprayed fluid selectively to a top side or a bottom side of a horizontally moving web. Previous spray generating units, such as the spray generating unit of the aforesaid patent, have applied spray to the full width of a moving web. There is a need for applying sprayed fluid to less than the full width of a moving web and to webs of various widths, such as webs that are narrower than the spray pattern. The present invention satisfies all such needs.

A preferred embodiment of the invention uses a duplex machine in which two spray generating units are provided, spaced one above the other, with an object to be sprayed, such as horizontally moving web, between the units. An upper unit sprays downwardly onto an upper surface of the web, and a lower unit sprays upwardly onto a lower surface of the web.

Each spray generating unit has a pair of cut-offs that intercept end portions of the spray pattern from that unit and that are adjustable to control the length of the spray pattern laterally of the web, thereby to accommodate different web widths, for example. The sprayed fluid that is intercepted by the cut-offs is collected in a receptacle, from which it may be re-circulated.

The spray generating units can be operated at the same time or selectively. The cut-offs of each pair are preferably adjustable toward one another to a position at which a spray emission opening of the associated spray generating unit is blocked, so that when a spray generating unit is not in operation, internal parts are protected from external contaminants. A single spray generating unit can be employed when the ability to spray opposite surfaces of an object is unimportant.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
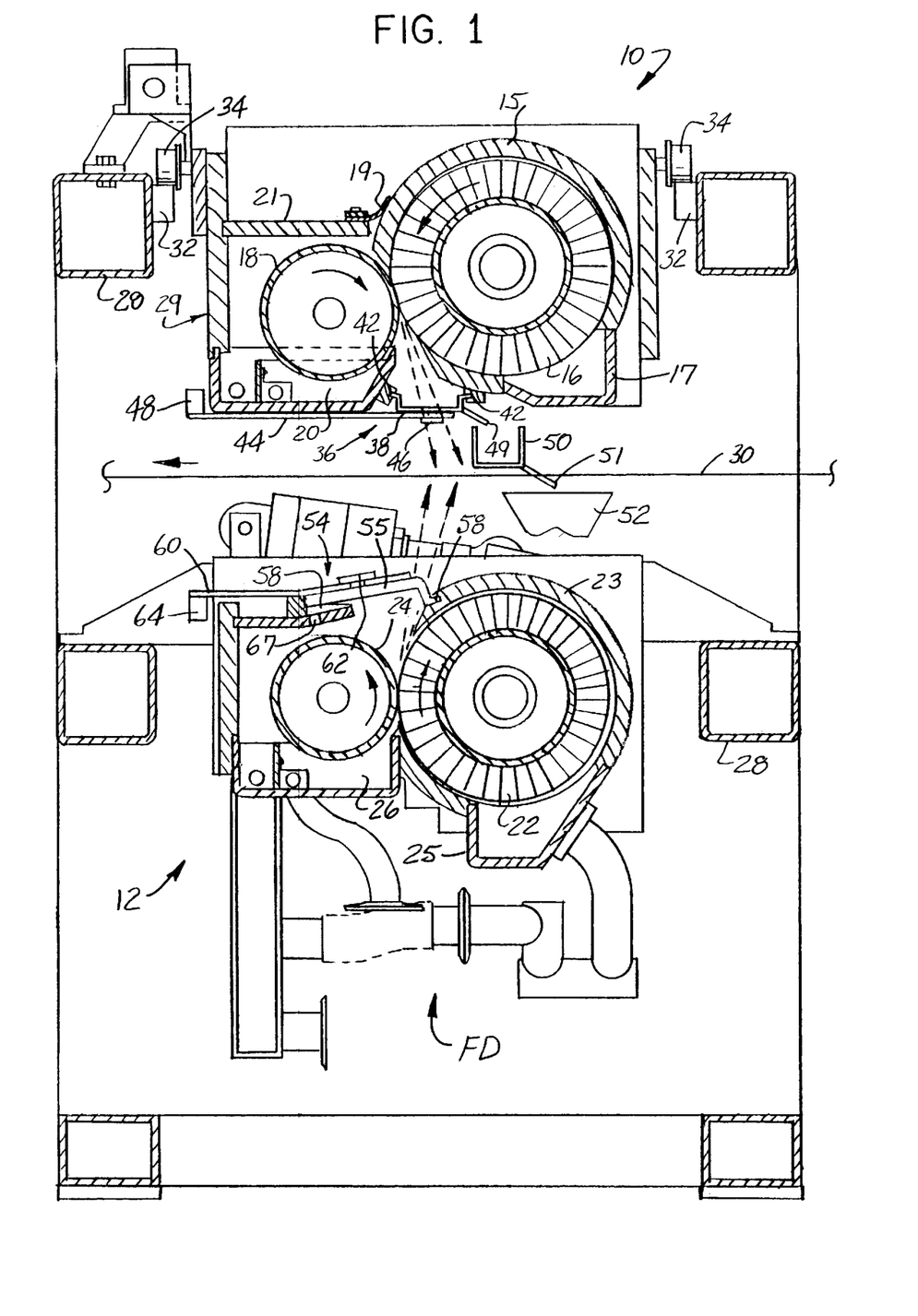
FIG. 1 is a vertical sectional view of apparatus of the invention.

FIG. 1 shows a duplex machine of the invention that includes a spray-down unit 10 and a spray-up unit 12. The spray-down unit includes a brush roll 16 and a pick-up roll 18 that transfers fluid to bristles of the brush roll from a trough 20, connected to a fluid distribution system. The brush roll 16 is partially surrounded by a cylindrical cover or shell 15 having an opening for communicating with a drain pan 17 (for draining fluid to the distribution system) and has an opening at which the brush roll is in interference with the pick-up roll 18. The drain pan 17 is provided with a series of baffles spaced along its length (described later). A windage gasket 19 blocks air passage between the cover 15 and a wall 21 forming part of a housing 29 of the spray-down unit.

The spray-up unit includes a brush roll 22 and a pick-up roll 24 that transfers fluid from a trough 26 to the brush roll. The spray-up unit has a cylindrical brush roll cover 23 and a brush roll drain pan 25 with internal baffles like the drain pan 17 of the spray-down unit. Drain pan 25 and trough 26 are connected to the fluid distribution system FD, which typically includes fill and drain tubes, a fluid sump and a pump, etc.

Further details of the above-described components of the two spray generating units can be found in the aforementioned patent.

The spray-down and spray-up units are mounted, one above the other, on a frame 28. A web or strip 30 to be coated moves horizontally between the two units. The spray-down unit 10 is supported on tracks 32 by means of rollers 34, so that the spray-down unit can be rolled end-wise away from the spray-up unit 12.

The width of the web or strip 30 (perpendicular to the plane of FIG. 1) can vary over a considerable range, from, for example, 24 inches to 76 inches. Of course, the length of the spray patterns laterally of the web or strip must be sufficient to accommodate the widest web or strip to be processed. In the preferred embodiment the web or strip is centered in the machine so that its longitudinal center line lies in a vertical plane that bisects the brush roll and the pick up roll.

Figure 2:
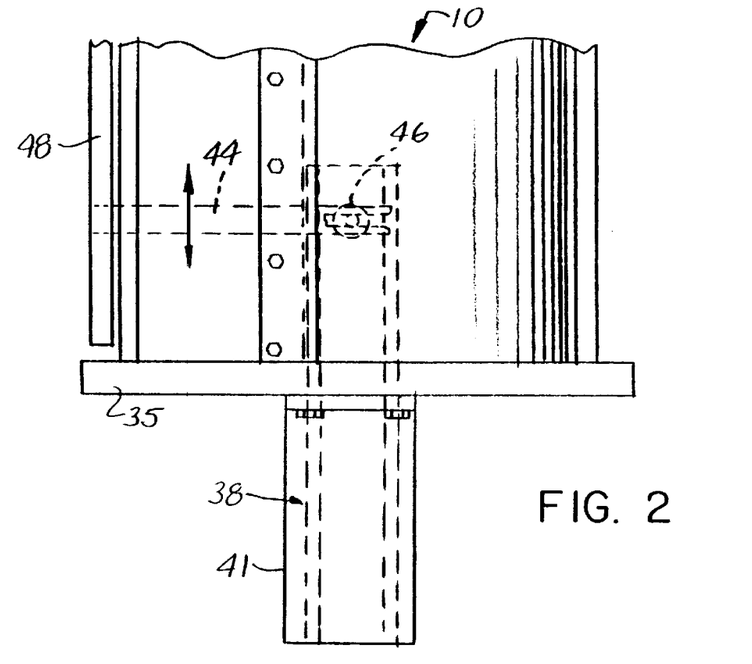
FIGS. 2 and 3 are fragmentary top plan views of cut-offs employed in the invention.
Figure 6:
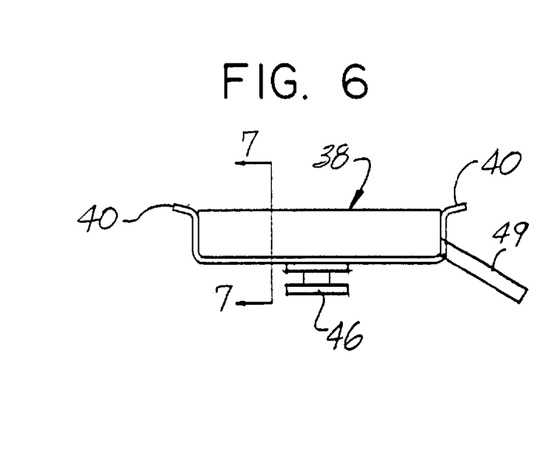
FIG. 6 is an end view of a cut-off catch pan employed in the invention.
Figure 7:
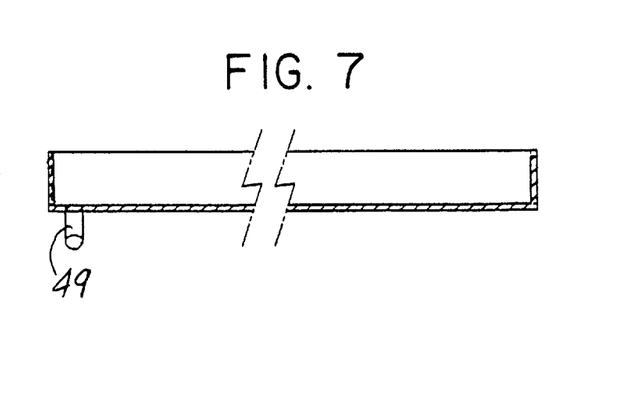
FIG. 7 is a contracted transverse sectional view taken along line 7—7 in FIG. 6.

The spray-down unit 10 has cut-offs 36 in the form of catch pans 38 at opposite ends of the unit. Each catch pan has flanges 40 (see FIG. 6) for slidably mounting the pan in track grooves 42. Each pan is coupled to a fork 44 that engages a pin 46 on the bottom of the pan. See FIG. 2. The fork is moved by an operator 48 to adjust the position of the pan inwardly and outwardly of the spray-down unit, thereby to determine the length of the applied spray pattern laterally of the web 30. Each pan 38 intercepts an end portion of the downwardly directed spray generated by the spray-down unit 10. Fluid picked up by the pan passes via drain tubing 49 into a receptacle 50 extending along the length of the spray-down unit. Fluid in the receptacle passes via drain tubing 51 into one or more funnels 52 to return the fluid to the fluid distribution system.

Figure 3:
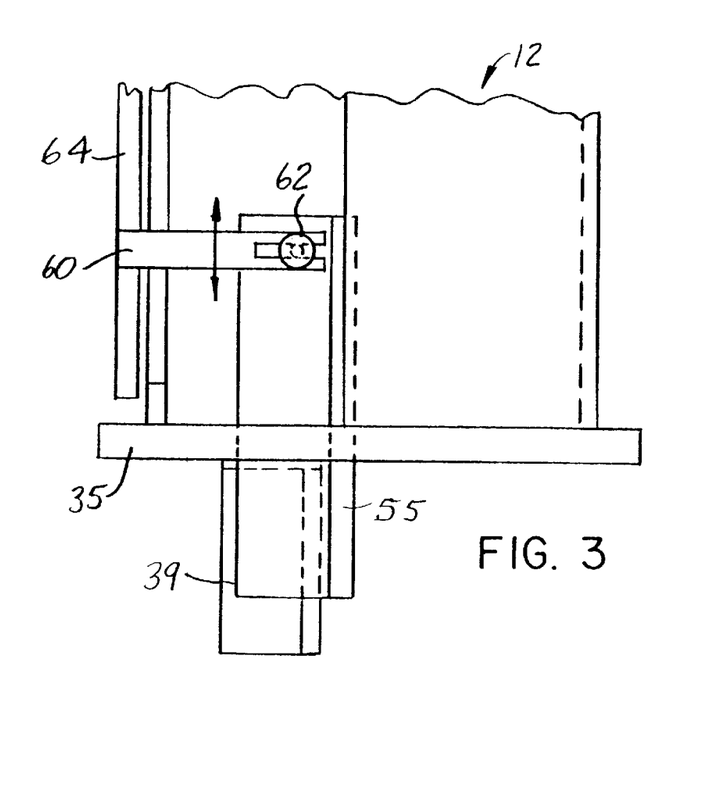

The spray-up unit 12 has cut-offs 54 in the form of plates 55 at opposite ends of the unit. Each plate has opposite longitudinal edges 56 (see FIGS. 4 and 5) mounted in track grooves 58 to permit the plate to slide inwardly and outwardly of the spray-up unit. Each plate is coupled to a fork 60 that engages a pin 62 on the top of the plate. See FIG. 3. The fork is moved by an operator 64 to adjust the position of each plate inwardly and outwardly of the spray-up unit laterally of the web 30.

Figure 4:
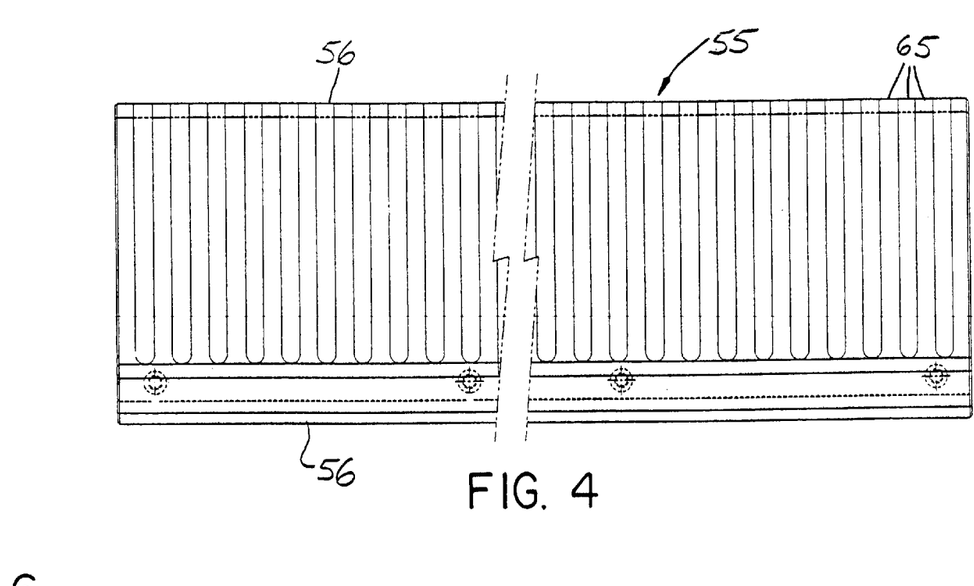
FIG. 4 is a contracted bottom plan view of a cut-off plate employed in the invention.
Figure 5:
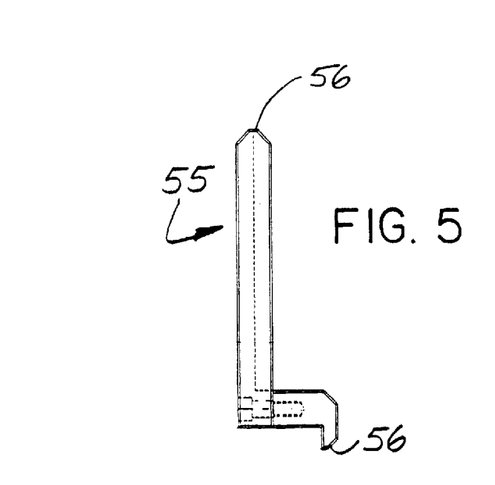
FIG. 5 is an end view of the plate of FIG. 4.

The plates 55 intercept end portions of the fluid spray pattern. As shown in FIG. 4, the lower surface of each plate has a series of laterally extending grooves 65. The laterally extending grooves prevent collected fluid from running the length of each plate and dripping back into the spray generating unit. The plates are tilted, as shown in FIG. 1, so that fluid picked up by the grooves runs into drain holes 67 beneath the lower ends of the grooves for return to the pick-up roll trough 26.

As shown in FIGS. 2, 3, 9, 10, and 11, the cut-offs of each spray generating unit pass through holes in end plates 35 and are stabilized by supports 39 and 41, such as brackets that extend outwardly from the end plates of the associated spray generating unit. The cut-offs of each pair are preferably movable inwardly of the machine to a position at which they completely block openings through which spray is emitted to the web 30. By virtue of this arrangement, any contaminants that may be in the air, such as dirt, dust, fiber particles, scale, etc., are blocked from entering the spray generating unit when it is not in use.

A duplex machine such as that illustrated in FIG. 1 permits simultaneous spray application to opposite surfaces of the web 30 through operation of the spray-down and spray-up generating units concurrently. If it is desired to apply fluid to only one surface of the web, one or the other spray generating unit may be operated selectively. For example, when it is desired to apply fluid to only the lower surface of a web, the spray-up unit is operative and the spray-down unit is inoperative.

Figure 8:
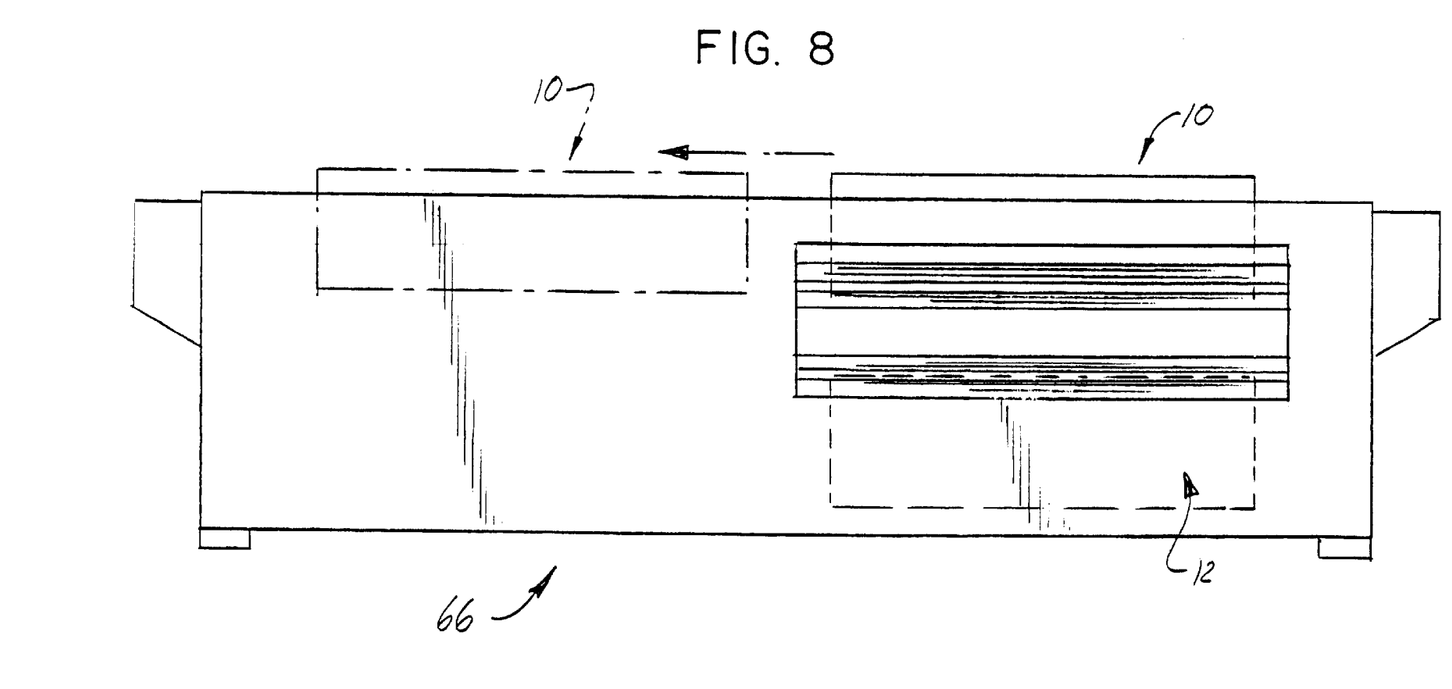
FIG. 8 is a diagrammatic side elevation view of apparatus of the invention.

To avoid the possibility of fluid from the spray-down unit dripping onto an upper surface of the web, the spray down unit is mounted on the frame 28 by the rollers 34 and tracks 32 referred to earlier, to permit the spray-down unit to be moved beyond one end of the spray-up unit to an idle position. FIG. 8 illustrates a duplex machine 66 comprising a spray-down unit 10 and a spray-up unit 12, and shows (in phantom) an alternative position of the spray-down unit when it is moved end-wise away from the spray-up unit.

Figure 9:
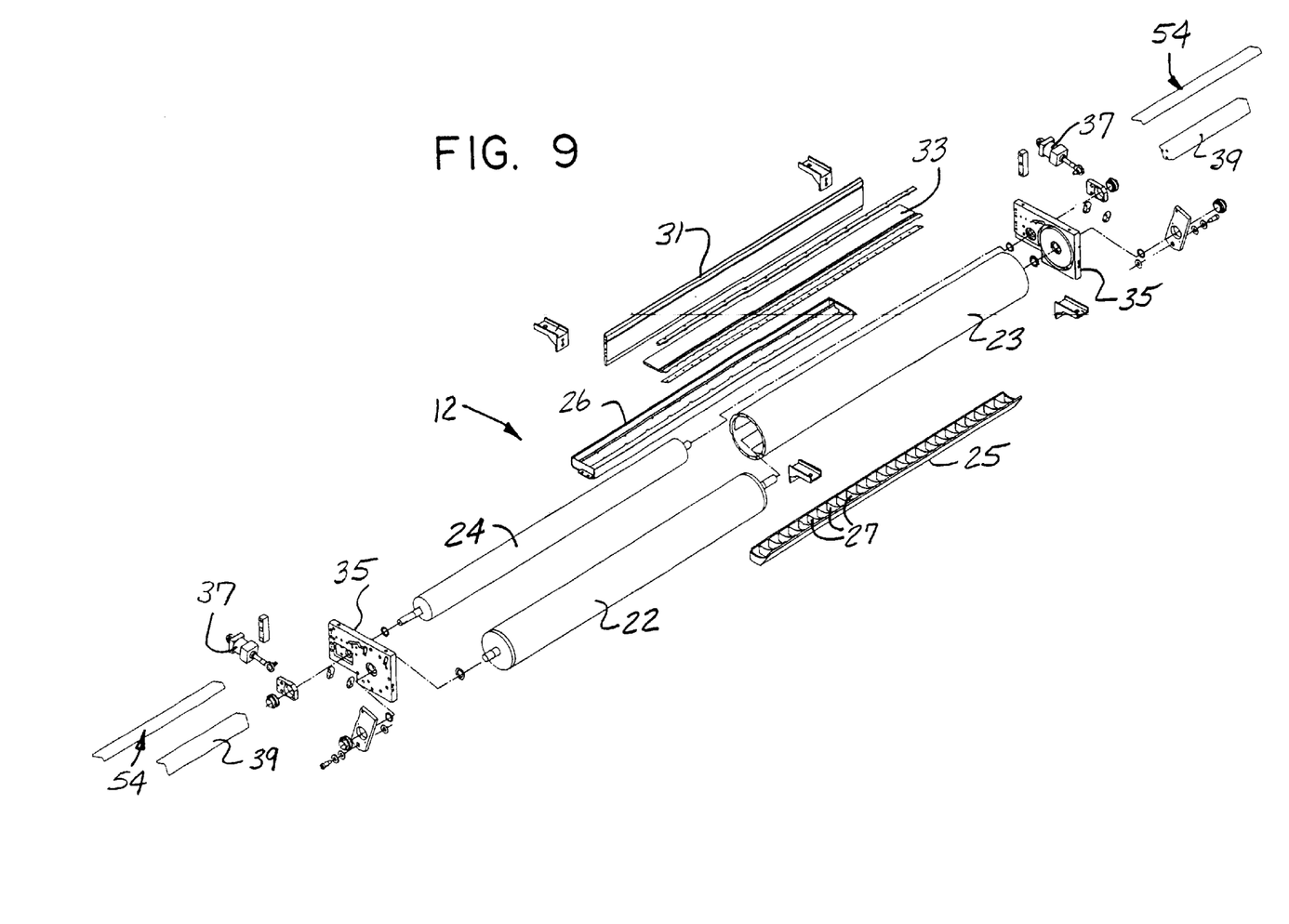
FIG. 9 is an exploded perspective view showing components of a spray-up unit of the invention.
Figure 10:
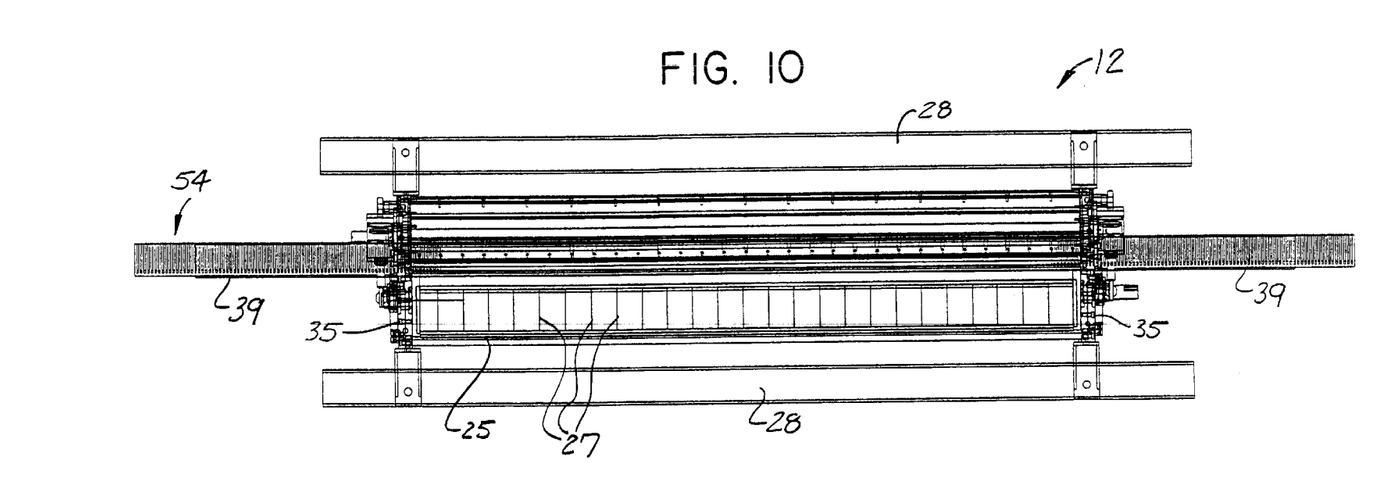
FIG. 10 is a top plan view of a spray-up unit of the invention.
Figure 11:
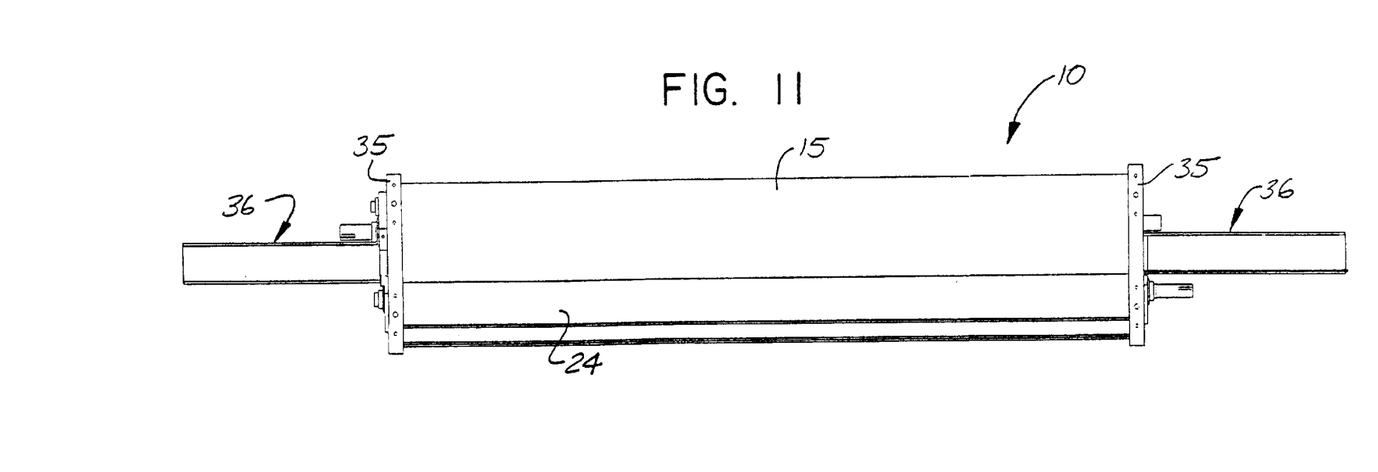
FIG. 11 is a top plan view of a spray-down unit of the invention.

FIGS. 9 and 10 show components of a spray-up unit 12, including brush roll 22, pick-up roll 24, brush roll cover 23, drain pan 25 with windage control baffles 27 (referred to earlier), fluid trough 26, frame cross bars 31, 33, end plates 35, actuators 37 for adjusting the interference between the pick-up roll and the brush roll, cut-off supports 39, and cut-offs 54. FIG. 11 shows components of a spray-down unit 10.

Typical operators 48 and 64 for moving the cut-offs include hydraulic cylinders, pneumatic cylinders, and electric motor operated screws. The adjustment can be made automatically in response to conventional photoelectric or other edge detectors that detect the width of a web to be coated, or can be made manually.

By the use of the spray cut-offs, fluid is re-routed back into the fluid distribution system to avoid waste of fluid due to misting or air flow. The grooves 65 on the cut-off plates 55 return fluid to the pick-up roll trough uniformly. This keeps the fluid from causing a disturbance in the trough that would cause a non-uniform application to the pick-up roll.

Commonly, the fluids to be sprayed must maintain a constant temperature to ensure that a specific viscosity is sustained. If the viscosity changes, the fluid output will change. By trapping unused fluid in the spray cut-offs, the fluid is kept from being cooled down by air and is returned at a more constant temperature. Accordingly, electric heaters used to maintain the fluid temperature need not run as much.

The spray cut-offs accommodate varying widths of material to be coated. In a duplex machine, the spray cut-offs of the spray-up unit prevent fluid from undesirably spraying into the spray-down unit, and prevent loss of fluid and unintended coating of nearby objects or the upper surface of the web. The spray cut-offs of the spray-down unit prevent fluid from undesirably spraying into the spray-up unit, which could cause the spray-up unit to flood and produce an uneven spray pattern.

While a preferred embodiment of the invention has been shown and described, it will be apparent to those skilled in the art that changes can be made without departing from the principles and spirit of the invention, the scope of which is defined in the accompanying claims.

The invention claimed is:

1. Apparatus for spraying fluid onto an object, such as a moving web, comprising a pair of spray generating units, one of which is a spray-down unit positioned to spray downwardly onto the object and the other of which is a spray-up unit positioned to spray upwardly onto the object, each of said units having a pair of spray cut-offs that are adjustable toward and away from one another to intercept opposite end portions of a spray pattern of that unit.

2. Apparatus according to claim 1, wherein the spray-down unit is supported for movement away from the spray-up unit.

3. Apparatus according to claim 1, wherein the cut-offs of each unit are adjustable toward one another to a position at which the cut-offs block contaminants from entering the unit.

4. Apparatus according to claim 1, wherein the cut-offs of the spray-down unit comprise catch pans constructed to collect sprayed fluid.

5. Apparatus according to claim 4, wherein the catch pans are constructed to direct intercepted fluid to a receptacle.

6. Apparatus according to claim 1, wherein the cut-offs of the spray-up unit comprise plates that intercept sprayed fluid.

7. Apparatus according to claim 6, wherein the plates have a series of laterally extending grooves that impede longitudinal flow of intercepted fluid.

8. Apparatus according to claim 7, wherein the plates slope to direct intercepted fluid to a receptacle.

9. Apparatus according to claim 1, wherein the spray generating units are supported one above the other for simultaneous spraying of opposite surfaces of a horizontally moving web.

10. Apparatus for spraying fluid onto an object, such as a moving web, comprising a pair of spray generating units, one of which is a spray-down unit positioned to spray downwardly onto the object and the other of which is a spray-up unit positioned to spray upwardly onto the object, each of said units having a pair of spray cut-offs that are adjustable to intercept end portions of a spray pattern of that unit, wherein each of the spray generating units comprises counter-rotating fluid pick-up and brush rolls disposed to transfer fluid from the pick-up roll to the brush roll.

11. Apparatus according to claim 10, wherein the pick-up roll and the brush roll are supported for rotation between a pair of end plates and the cut-offs pass through the end plates and have supports that extend outwardly from the end plates.

12. A method of spraying fluid onto an object, such as a moving web, comprising:
spraying fluid downwardly onto the object;
spraying fluid upwardly onto the object;
intercepting end portions of spray patterns produced by the downward and upward sprays to limit the length of each spray pattern; and
further comprising adjusting the length of the intercepted end portions of each spray pattern and thereby adjusting the length of the spray pattern applied to the object.

13. A method according to claim 12, wherein the downward spraying and upward spraying are conducted simultaneously to apply spray to opposite surfaces of the object concurrently.

14. A method of spraying fluid onto an object, such as a moving web, comprising:
providing a pair of spray generating units, one of which is a spray-down unit positioned to spray downwardly onto the object and the other of which is a spray-up unit positioned to spray upwardly onto the object; and
providing each unit with a pair of spray cut-offs that are adjustable toward and away from one another to intercept opposite end portions of a spray pattern.

15. A method according to claim 14, wherein the spray cut-offs of one of the units are adjusted to block an opening through which the spray of that unit is emitted.

16. Apparatus for spraying fluid onto a moving web, comprising a pair of spray generating units, one of which is a spray-down unit positioned to spray downwardly onto the moving web and the other of which is a spray-up unit positioned to spray upwardly onto the moving web, each of the units having a spray pattern that extends transversely of the moving web, and each of the units having a pair of spray cut-offs that are disposed to intercept opposite end portions of the spray pattern of that unit adjacent to longitudinal edge portions of the moving web.

17. Apparatus according to claim 16, wherein the spray generating units and the moving web are arranged symmetrically.

18. Apparatus according to claim 16, wherein the spray cut-offs are adjustable toward and away from one another to adjust the extent to which opposite end portions of the spray patterns are intercepted.

19. Apparatus according to claim 16, wherein each of the spray generating units comprises counter-rotating fluid pick-up and brush rolls disposed to transfer fluid from the pick-up roll to the brush roll.

20. Apparatus according to claim 19, wherein the pick-up roll and the brush roll are supported for rotation between a pair of end plates and the cut-offs pass through the end plates and have supports that extend outwardly from the end plates.

21. Apparatus according to claim 19, wherein the spray-down unit is supported for movement away from the spray-up unit.

22. Apparatus according to claim 19, wherein the cut-offs of each unit are adjustable toward one another to a position at which the cut-offs block contaminants from entering the unit.

23. Apparatus according to claim 19, wherein the cut-offs of the spray-down unit comprise catch pans constructed to collect sprayed fluid.

24. Apparatus according to claim 23, wherein the catch pans are constructed to direct intercepted fluid to a receptacle.

25. Apparatus according to claim 19, wherein the cut-offs of the spray-up unit comprise plates that intercept sprayed fluid.

26. Apparatus according to claim 25, wherein the plates have a series of laterally extending grooves that impede longitudinal flow of intercepted fluid.

27. Apparatus according to claim 26, wherein the plates slope to direct intercepted fluid to a receptacle.

28. Apparatus according to claim 19, wherein the spray generating units are supported one above the other for simultaneous spraying of opposite surfaces of a horizontally moving web.

29. A method of spraying fluid onto a moving web, comprising:
spraying fluid downwardly onto the moving web in a spray pattern that extends transversely of the moving web;
spraying fluid upwardly onto the moving web in a spray pattern that extends transversely of the moving web; and
inserting spray cut-offs into the spray patterns at positions adjacent to longitudinal edge portions of the moving web so as to intercept end portions of the spray patterns and thereby to limit the length of the spray patterns transversely of the moving web.

30. A method according to claim 29, further comprising moving the cut-offs to thereby adjust the length of the spray patterns applied to the moving web.

31. A method according to claim 29, wherein the downward spraying and upward spraying are conducted simultaneously to apply spray to opposite surfaces of the moving web concurrently.

32. A method according to claim 29, wherein the spraying is performed by spray generating units disposed symmetrically with respect to the moving web.

33. A method according to claim 32, wherein the spray cut-offs for a spray pattern of one of the units are adjusted to block an opening through which the spray of that unit is emitted.

34. A method according to claim 29, wherein the spraying is performed by spray generating units, each comprising counter-rotating fluid pick-up and brush rolls, and wherein fluid is transferred from the pick-up roll to the brush roll.

35. A method according to claim 34, wherein the pick-up roll and the brush roll rotate between a pair of end plates and the cut-offs move through the end plates and are supported outwardly from the end plates.

* * * * *